United States Patent
Walden

[11] Patent Number: 5,664,365
[45] Date of Patent: Sep. 9, 1997

[54] TRAILER FISH HOOK

[76] Inventor: Danny Walden, 2194 Waverly Ferry Rd., Columbus, Miss. 39701

[21] Appl. No.: 567,234

[22] Filed: Dec. 5, 1995

[51] Int. Cl.$^6$ .................................................. A01K 83/06
[52] U.S. Cl. .................... 43/44.82; 43/42.13; 43/44.81
[58] Field of Search ........................ 43/44.83, 43.14, 43/44.2, 44.4, 44.8, 44.82, 44.81, 43.16, 42.13

[56] References Cited

U.S. PATENT DOCUMENTS

| | | | |
|---|---|---|---|
| 745,221 | 11/1903 | Miller | 43/44.2 |
| 1,875,182 | 8/1932 | Southwell | 43/44.82 |
| 2,632,278 | 3/1953 | Raymond | 43/44.82 |
| 2,680,321 | 6/1954 | Premo | 43/44.82 |
| 2,908,990 | 10/1959 | Rimbach | 43/44.82 |
| 2,922,247 | 1/1960 | Buss | 43/44.8 |
| 2,926,454 | 3/1960 | Gottman | 43/44.83 |
| 2,984,882 | 5/1961 | Winn | 24/131 |
| 3,013,357 | 12/1961 | Bujjoni | 43/44.82 |
| 3,061,968 | 11/1962 | Stroud | 43/44.8 |
| 3,209,483 | 10/1965 | Malik | 43/44.82 |
| 3,778,921 | 12/1973 | Peterson | 43/44.8 |
| 4,232,470 | 11/1980 | Steffick, Jr. | 43/43.16 |
| 4,470,217 | 9/1984 | Adams | 43/44.8 |
| 4,750,291 | 6/1988 | Chilton | 43/44.82 |
| 4,819,366 | 4/1989 | Manno | 43/44.83 |
| 4,823,500 | 4/1989 | Shindeldecker | 43/44.81 |
| 5,265,370 | 11/1993 | Wold | 43/44.82 |

FOREIGN PATENT DOCUMENTS 1014372  8/1957  Germany .................. 43/43.16

*Primary Examiner*—Joseph J. Hail, III
*Attorney, Agent, or Firm*—Antonelli, Terry, Stout & Kraus, LLP

[57] ABSTRACT

A trailer fish hook which is attachable to a primary fish hook. The trailer fish hook has a full turn loop in the middle of its shaft and an open loop at the end. The primary fish hook barb is passed through the center full loop and then pivoted so that the open loop snaps onto the shank of the primary fish hook.

5 Claims, 2 Drawing Sheets

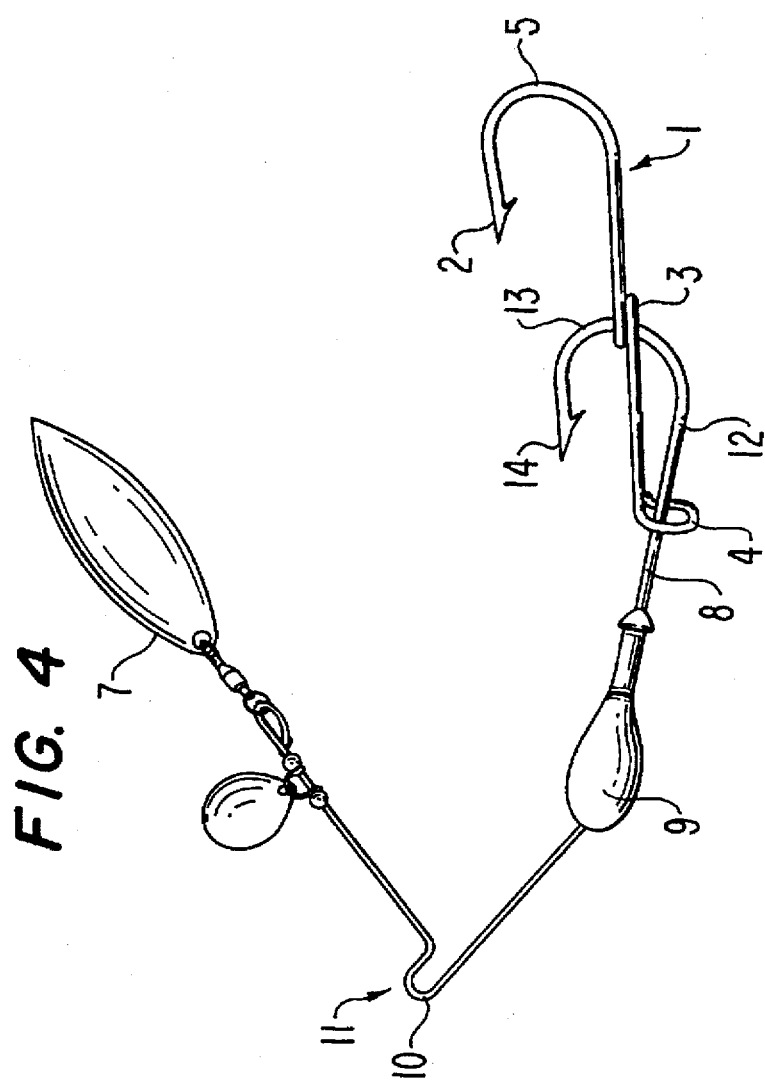
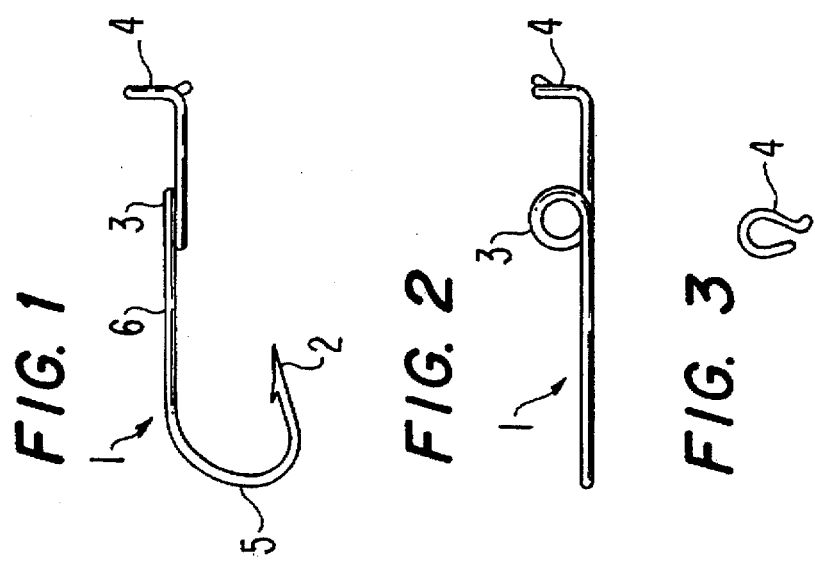

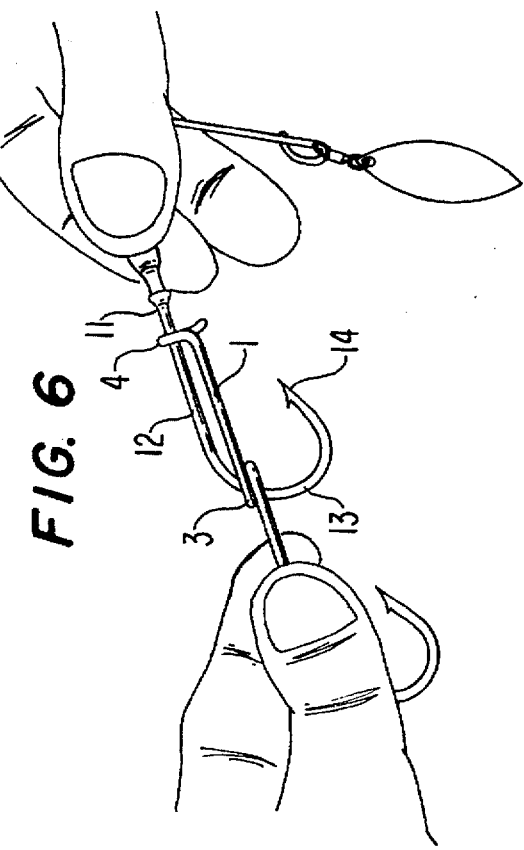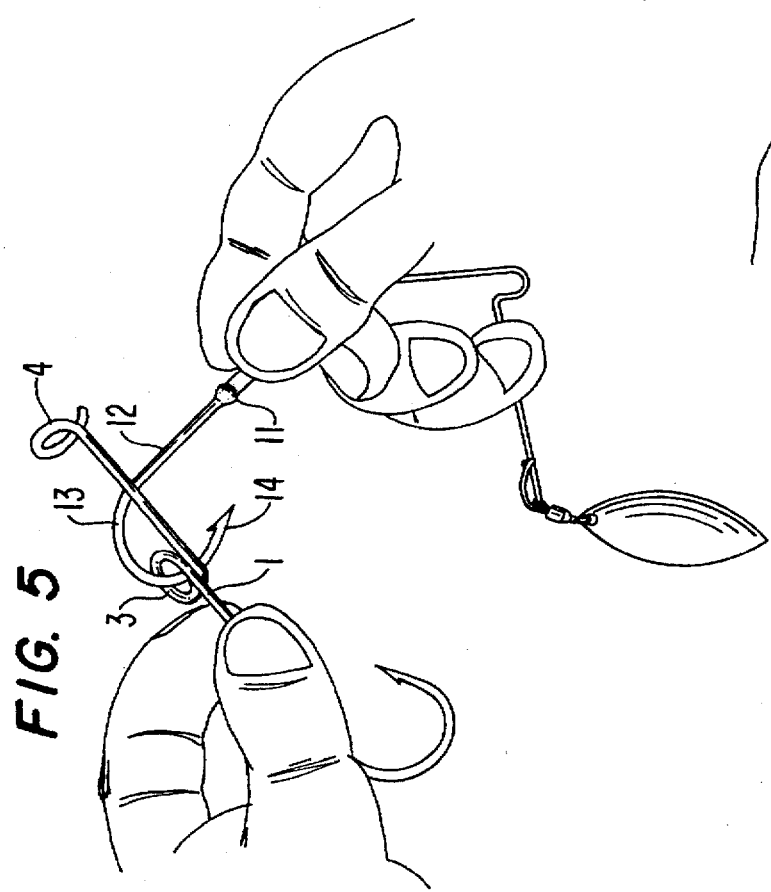

TRAILER FISH HOOK

BACKGROUND TO THE INVENTION

The present invention relates generally to fishing hooks and more particularly to a fishing hook adapted for utilization as a trailer fish hook or stinger fish hook.

It is known that fish will often strike short when striking toward a baited hook or fishing lure. Furthermore, fish sometimes strike the bait or lure while missing the hook. To counteract these tendencies, sport and commercial fishermen have used a trailer fish hook or stinger fish hook to improve the chances of catching a fish.

The term "trailer fish hook" is generally used to refer to a secondary fish hook which has its eyelet portion slipped over the end of a primary fish hook. The term "stinger fish hook" has been applied to similar fish hooks which are attached to the shank of the primary fish hook by wrappings. Both trailer and stinger fish hooks are used for the same purposes. In the following specification and claims, the term "trailer fish hook" is used to describe both trailer fish hooks and stinger fish hooks, as well as related devices regardless of their means for attachment.

Conventional trailer fish hooks are typically standard fish hooks, with the fisherman hooking the eye of one fish hook over the barb of a primary fish hook, usually with some additional device used to prevent the trailer fish hook from slipping free of the primary fish hook. Unfortunately, the trailer fish hook dangles loosely rather than being maintained at a desired position with respect to the bait or the primary fish hook because the trailer fish hook is connected at only one location. This Can make fish removal and removal or cleaning of the fish hooks difficult and potentially dangerous.

In use, a dangling trailer fish hook is more likely to be snagged or hung up on branches, weeds, fish line or other items under water. Fine manipulation to tie knots, adjust lures, and bait hooks is also frustrating and potentially injurious with difficult-to-control trailer fish hooks. Likewise, difficulty in attaching trailer fish hooks presents the same problems.

A number of patents disclose trailer fish hooks and is similar devices, but each of these is overly complex and/or suffers from certain drawbacks, such as those mentioned above. Examples include U.S. Pat. Nos. 4,750,291, 4,470, 217, 4,232,470, 3,061,968, 2,984,882, 2,922,247, 2,908,990 and 2,632,278.

SUMMARY OF THE INVENTION

It is an object of the present invention to provide a trailer fish hook which maintains a fixed position with respect to the primary fish hook.

It is another object of the present invention to provide a trailer fish hook which is readily attachable and detachable by hand without tools.

It is a further object of the present invention to provide a snap fitting trailer fish hook, having a resilient attachment means located at one terminal end of the trailer fish hook.

It is still a further object of the present invention to provide a trailer fish hook which permits a plural number of trailer fish hooks to be used by attaching one trailer fish hook to another trailer fish hook, etc.

It is yet another object of the present invention to provide a fish hook assembly having both a primary fish hook and a trailer fish hook either connected together or separately in kit form.

It is still another object of the present invention to provide a trailer fish hook which, once a fish is caught, may be readily separated from the primary fish hook without first removing the fish from the trailer fish hook. This permits the easy removal of the hooked fish from the lure or primary fish hook, easy stringing of the caught fish, and easy replacement of a new trailer fish hook without first removing the hook from the fish, which may be difficult in certain circumstances.

These and other objects and advantages are achieved by a trailer fish hook having a full loop approximately in the middle of its shaft and an open loop forming a snap fitting member at the end of its shaft. The other end of the trailer fish hook has a conventional curved and barbed hook for catching fish.

BRIEF DESCRIPTION OF THE DRAWINGS

FIG. 1 is a side view of a trailer fish hook in accordance with a preferred embodiment of the present invention.

FIG. 2 is a top view of the trailer fish hook of FIG. 1.

FIG. 3 is an end view of the trailer fish hook of FIG. 1 showing in particular the terminal attachment means.

FIG. 4 is a side view of the trailer fish hook of FIG. 1 attached to a spinner lure to make up a fish hook assembly in accordance with the present invention.

FIGS. 5 and 6 illustrate steps in the attachment of the trailer fish hook of FIG. 1 onto a primary fish hook.

The figures are drawn to demonstrate certain features and are not necessarily drawn to scale with respect to other components. Furthermore, certain components are drawn schematically when numerous different designs are possible.

DESCRIPTION OF THE PREFERRED EMBODIMENT

Trailer fish hook 1, shown in a side view in FIG. 1 and in a top view in FIG. 2, preferably is made of a wire-like material. Trailer fish hook 1 has a pointed barbed terminal 2 attached to a curved portion 5 at one end of a shaft 6. A closed loop 3 is formed in the shaft 6. At the other end of shaft 6, an open loop 4 forms a resilient attachment means which can snap onto the shank of a primary fish hook. FIG. 3 shows the end view of the open loop 4.

In FIG. 4, a conventional spinner lure 11 is shown having on one of its arms a shank 12, a curved portion 13 and a barbed end 14. A typical fishing lure having a spinner is illustrated by Woolums, U.S. Pat. No. 3,546,804. The other arm of spinner lure 11 has a spinner 7. The arms are connected by an open eye 10 for attachment to a fishing line. A weight 9 maintains correct orientation of the lure 11 in water.

As depicted in FIGS. 5 and 6, trailer fish hook 1 is attached to a conventional primary fish hook such as a spinner lure 11, by sliding the closed loop 3 of the trailer fish hook over the primary fish hook's barbed end 14, at least part way along the curved portion 13, and possibly part way up the shank portion 12. The trailer fish hook 1 is then pivoted so that the open loop 4 snaps onto the shank portion 12 of the primary fish hook. If closed loop 3 is positioned on the curved portion 13 of the primary fish hook as depicted in FIGS. 4 and 6, then the trailer fish hook can not rotate around the shank 12 of the primary fish hook, but instead has its barbed terminal 2 held in a fixed orientation with respect to the barbed end 2 of the trailer fish hook. The trailer fish hook may be removed by manipulation in the opposite manner.

The present invention as illustrated in FIG. 4 includes a trailer fish hook attached to a spinner lure forming a fish hook assembly. It will be appreciated that the primary fish hook may have any of a number of different designs, including a simple fish hook, an elaborate lure or other means for holding bait.

Important to the invention is the trailer fish hook contacting the primary fish hook in at least two locations: the open loop 4 and the central closed loop 3. This two point attachment maintains the trailer fish hook in a fixed orientation with respect to the primary fish hook, rather than dangling freely.

The central loop 3 may be integral with shaft 6, or welded, tied, soldered or adhesively attached thereto. Loop 3 may be of any size, provided that the barbed end 14 of the primary fish hook 8 can be slid through it. For ease of manufacture, the shaft 6 of the trailer fish hook may be bent to form a full loop. The location of the full loop 3 need not be in the center of shaft 6, it only need be located between the open loop 4 and the curved portion 5. The preferred location of full loop 3 varies in accordance with the position at which one wishes the trailer fish hook is to be located with respect to the primary fish hook. For example, if the trailer fish hook 1 is to have its barbed end 2.far away from the primary fish hook's barbed end 14, then the portion of shaft 6 between the full loop 3 and the curved portion 5 is made longer. The desired location can be selected in accordance with the type of tackle, the type of fish sought, and the location and type of bait or lure.

If desired, plural trailer fish hooks may be employed, with additional trailer fish hooks being attached in sequence to a first trailer fish hook that is attached to the primary fish hook. Likewise, plural trailer fish hooks can be attached to single a primary fish hook, with each trailer fish hook having a different length so as to be a different distance from the primary fish hook or with each being angled in a slightly different direction or having its curved portion 5 pointed in a different direction.

The foregoing description of the specific embodiments reveals the general nature of the invention so that others can, by applying current knowledge, readily modify and/or adapt such specific embodiments for various applications without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

All references mentioned in this application are incorporated by reference.

What is claimed is:

1. A fish hook assembly comprising;

a primary fish hook having means for attachment to a fishing line, a barbed end, a curved portion connected to the barbed end, and a shank portion connecting the curved portion and the attachment means, and a trailer fish hook having a barbed end portion, a substantially straight shaft portion with a central ring and with an open loop forming terminal resilient attachment means adapted to snap on the shank portion of the primary fish hook, and a curved portion connecting the trailer fish hook barbed end portion and the substantially straight shaft portion, wherein the barbed end potion and the curved potion of the primary fish hook are threaded through the central ring of the trailer fish hook so that the central ring encircles the primary fish hook curved portion, and the open loop terminal resilient attachment means is snapped on the shank portion of the primary fish hook and held thereon by the resilience of the open loop terminal resilient attachment means.

2. A fish hook assembly according to claim 1, wherein the central ring of the trailer fish hook is at least one full turn loop.

3. A fish hook assembly according to claim 1, wherein the central ring is located approximately in the middle of the shaft portion of the trailer fish hook.

4. A fish hook assembly according to claim 1, wherein the primary fish hook has an eye for attaching a fish line and two arms, one arm comprising the primary fish hook shank portion, and the other arm having a lure thereon.

5. A fish hook assembly according to claim 4, wherein the lure is a spinner.

* * * * *